United States Patent [19]
Takigawa et al.

[11] 3,896,465
[45] July 22, 1975

[54] CAMERA USING A FILM MAGAZINE

[75] Inventors: Tomoshi Takigawa; Yoshio Komine, both of Tokyo, Japan

[73] Assignee: Canon Kabushiki Kaisha, Tokyo, Japan

[22] Filed: Dec. 13, 1973

[21] Appl. No.: 424,434

Related U.S. Application Data

[63] Continuation of Ser. No. 251,002, May 8, 1972, abandoned.

[52] U.S. Cl. ................................. 354/174; 352/72
[51] Int. Cl.² ......................................... G03B 19/10
[58] Field of Search ......... 95/31 FS, 31 CA, 31 FM, 95/10 C, 64 D; 352/72-78, 141

[56] References Cited
UNITED STATES PATENTS

| | | | |
|---|---|---|---|
| 2,357,076 | 8/1944 | Briskin et al. | 352/74 |
| 3,194,133 | 7/1965 | Benson | 95/31 FS X |
| 3,395,630 | 8/1968 | Haufler et al. | 352/72 X |
| 3,444,798 | 5/1969 | Mayr et al. | 352/72 X |
| 3,485,157 | 12/1969 | Nerwin | 95/31 CA |
| 3,561,341 | 2/1971 | Freudenschusz | 352/78 X |
| 3,591,270 | 7/1971 | Takahashi | 352/72 |
| 3,625,125 | 12/1971 | Iida | 95/11 R |
| 3,626,829 | 12/1971 | Iida et al. | 95/31 FS |
| 3,673,934 | 7/1972 | Carlson | 95/11 R |
| 3,733,119 | 5/1973 | Catalano et al. | 352/78 R |

FOREIGN PATENTS OR APPLICATIONS

| | | | |
|---|---|---|---|
| 1,247,855 | 8/1967 | Germany | 352/72 |

*Primary Examiner*—John M. Horan
*Attorney, Agent, or Firm*—William R. Woodward

[57] ABSTRACT

This specification discloses a camera provided with a means for holding a film magazine in a predetermined position within the camera body. The holder means has a resilient engaging member which is engageable with at least a portion of the magazine housing to impart a holding pressure force to the magazine in the direction in which the magazine is inserted, thereby holding the magazine in a predetermined position within the camera. The holder means is provided on the camera body and can perform its holding function independently of the opening-closing action of a lid covering the magazine receiving chamber, whereby various types of information representing the various characteristic values and provided on the magazine may be transmitted to the camera body.

7 Claims, 10 Drawing Figures

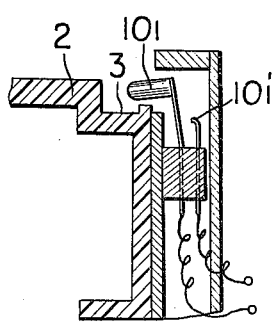
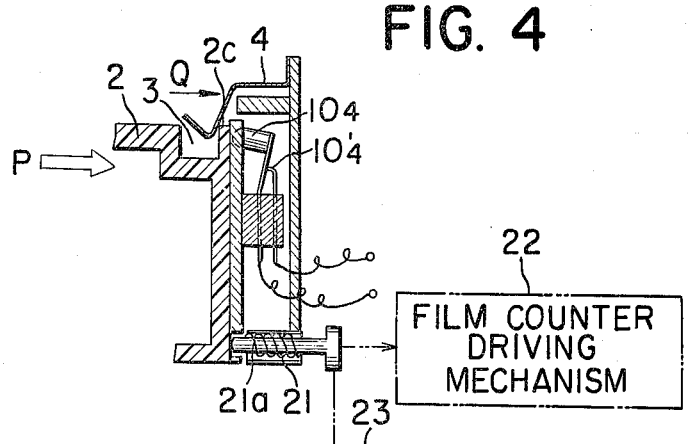
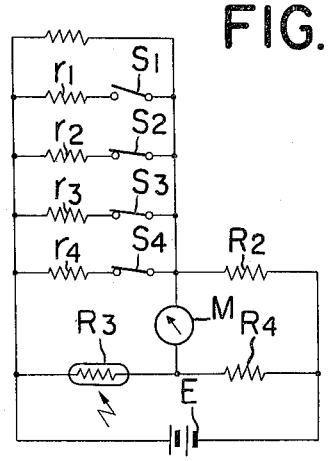
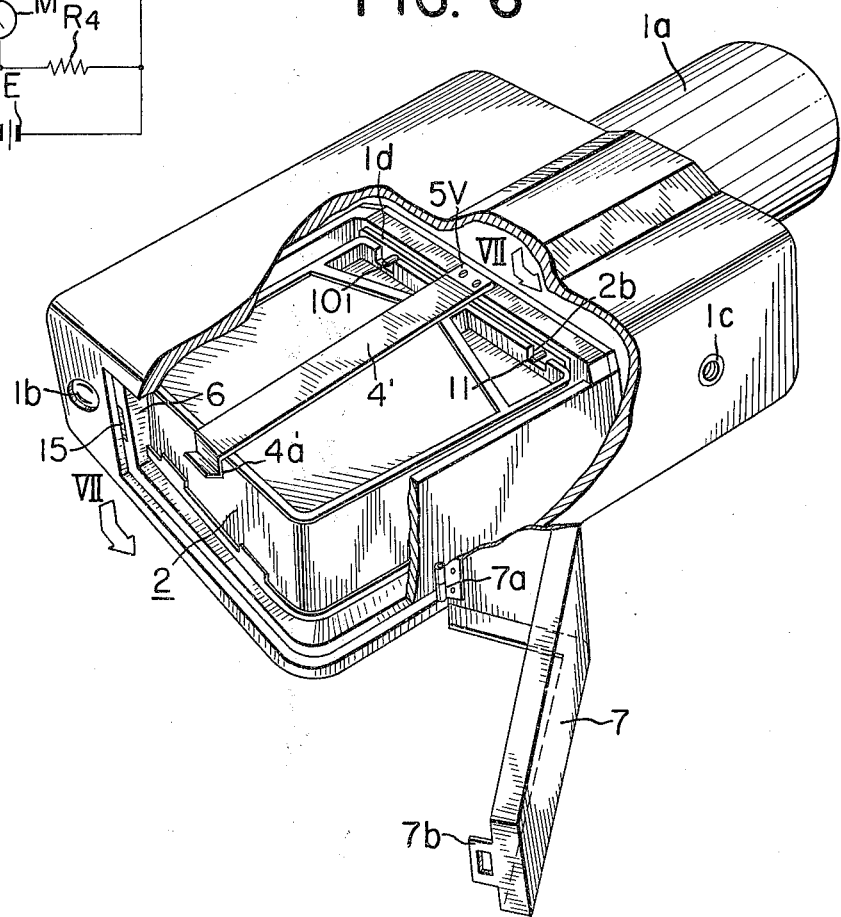

CAMERA USING A FILM MAGAZINE

This is a continuation, of application Ser. No. 251,002 filed May 8, 1972, and now abandoned.

BACKGROUND OF THE INVENTION

1. Field of the Invention

This invention relates to a camera provided with an improved means for holding a film-containing magazine or cartridge in a predetermined position within the camera.

2. Description of the Prior Art

In picture taking, it has become more popular to use cameras with a magazine or cartridge containing a roll of film being inserted in a predetermined position within the cameras. To enable the use of such a magazine, cartridge or cassette (hereinafter generally referred to as "magazine") and to simplify the picture-taking operation, it is known to provide the magazine with some marking means representing the characteristics of the film in the magazine and to construct a camera such that various mechanisms therein may be automatically set in accordance with the characteristics of the film in use once the magazine is inserted in a predetermined position within the camera and a lid is closed to cover the camera's magazine receiving chamber. For example, U.S. Pat. No. 3,260,182 discloses a device which works in response to the closing action of a lid for the camera's magazine receiving chamber to adjust an interior control mechanism in accordance with the film characteristic value representing marks attached to the magazine. Also, U.S. Pat. No. 3,208,363 shows a device which, upon insertion of a magazine into a camera, controls the selection of color temperature converting filters within the camera in accordance with the marks representing the type of the film contained in the magazine. Further, U.S. Pat. No. 3,297,397 discloses a film counter which is engageable with a drive mechanism upon insertion of a magazine into a camera and disengageable from the drive mechanism upon removal of the magazine.

In such cameras wherein insertion of a magazine thereinto causes either the film characteristic value or film type representing information carried on the magazine to be transmitted to the camera's various mechanisms or causes the film counter mechanism to be brought into its operation, it is essential that the magazine be not only inserted but also held in a predetermined position within the camera's magazine receiving chamber.

In case where the lid for the magazine receiving chamber has to be opened while the film still has some unexposed portion, it is not desirable that the aforesaid various mechanisms, particularly the film counter, is reset. Also, even after the film in the magazine has all been exposed, the magazine must be prevented from inadvertently coming off the camera when the lid of the magazine receiving chamber is opened.

However, almost all of these conventional magazine holder devices are such that a resilient member for resiliently pressing the back or side wall of the magazine is provided on the lid of the magazine receiving chamber. Such devices would not function in the open position of the lid, and once the lid is opened, they would permit the magazine to come off the camera or to shift within the magazine receiving chamber and thereby reset the film counter or other setting mechanisms.

U.S. Pat. Nos. 3,625,125 and 3,626,829 show cameras for a desirable type of film magazine that is provided with recesses open to a broad side of the magazine located behind a portion of the front wall of the magazine through holes in which sensors of the camera may project, but the cameras shown in these patents are arranged for insertion of the magazine from the side with a motion substantially normal to the direction in which the magazine is loaded, with the result that a hinge cover or lid for the film magazine chamber is essential for holding the magazine in position and preventing it from falling out. On the other hand, U.S. Pat. No. 3,591,270 shows a film magazine that is inserted in the direction of loading and is held in place on its narrow edges by a detent after insertion, but there is no enclosure for the film magazine, reducing protection against stray light and also leaving the magazine exposed to shocks such as would strain the detent holding it in place.

SUMMARY OF THE INVENTION

It is an object of the present invention to provide a camera equipped with a magazine holder means which has eliminated all the above-noted disadvantages existing in the conventional holder devices.

It is another object of the present invention to provide a camera equipped with an improved magazine holder means which is formed on the camera body and engageable with a magazine inserted in the camera body to thereby hold the magazine in a predetermined position.

It is still another object of the present invention to provide a camera equipped with an improved magazine holder means which comprises a resilient member engageable with a magazine inserted in the camera's magazine receiving chamber to impart a holding pressure force to the magazine in the direction in which the magazine is inserted into the camera, thus holding the magazine in a predetermined position within the magazine receiving chamber.

It is yet another object of the present invention to provide a camera equipped with a magazine holder means which can hold a magazine in a predetermined position within a camera's protective magazine receiving chamber independently of the position of the lid for the chamber and also can maintain the camera's interior mechanisms in their positions as set by the magazine even if the lid is opened.

It is a further object of the present invention to provide a camera for use with a film magazine of the type having recesses open to the broad side of the magazine behind a portion of the front wall of the magazine, in which the magazine is inserted in the direction of loading and in which the magazine is retained in loaded position by spring members utilizing the same recesses and front wall as are used for communicating information regarding film type and film sensitivity, and in which the retaining members are disposed on either side of a positioning recess so as to hold the front wall of the magazine against the camera effectively over its whole length.

BRIEF DESCRIPTION OF THE DRAWINGS

The invention will become fully apparent from the following detailed description thereof taken in conjunction with the accompanying drawings, in which:

FIGS. 3 and 4 are sectional views of the holder means taken along arrows III—III IV—IV of FIG. 2, respectively;

FIG. 5 diagrammatically shows the major part of the electrical connection of the film exposure control mechanism as set by the means shown in FIGS. 1–4;

FIG. 6 is a partly broken-away perspective view of a camera provided with another embodiment of the magazine holder means according to the present invention;

and

Figure 10:
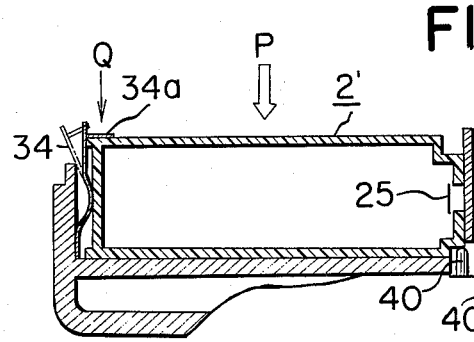
Figure 9:
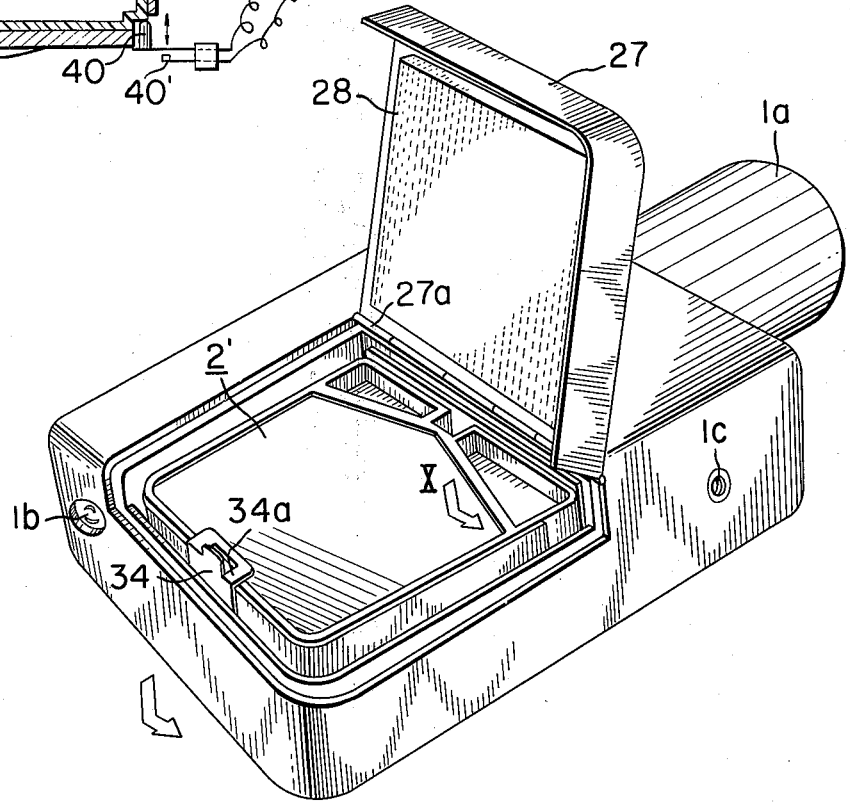
FIG. 9 is a perspective view of a further embodiment of the magazine holder means according to the present invention.

FIG. 10 is a sectional view taken along arrows X—X of FIG. 9.

Figure 1:
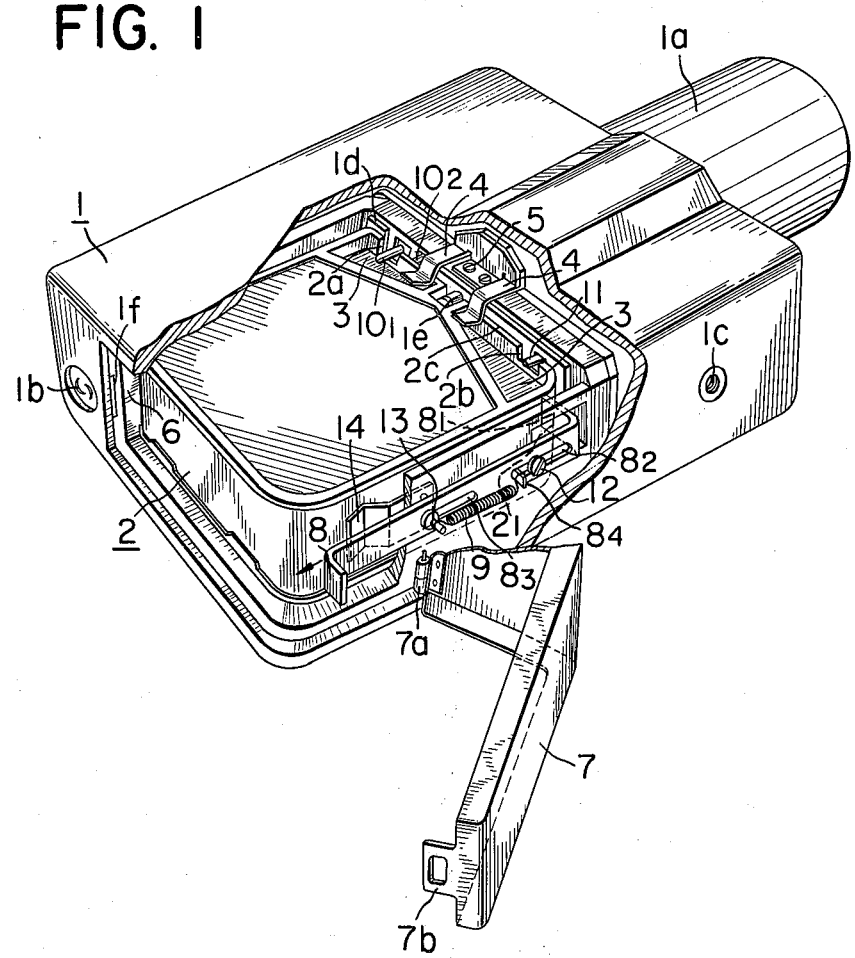
FIG. 1 is a partly broken-away perspective view of a camera provided with an embodiment of the magazine holder means according to the present invention.

DESCRIPTION OF THE PREFERRED EMBODIMENTS:

Referring to FIG. 1, an embodiment of the magazine holder device according to the present invention is shown as applied to a cinecamera, for example.

The cinecamera body is generally designated by numeral 1 and shown with a part thereof broken away. The cinecamera body 1 includes a body tube 1a, a viewfinder 1b and a threaded hole 1c for receiving a tripod. The cinecamera body 1 is loaded with a film containing magazine 2 in a magazine receiving chamber therein. The magazine 2 has recesses 3 pre-formed at any suitable locations thereof during the manufacture thereof. Where use is made of a magazine formed with recesses to allow escape of marking means for transmitting the sensitivity of a film in the magazine to the camera body, such recesses may be utilized as the recesses 3. A pair of resilient engaging members 4, formed integrally with each other, is secured to the camera body 1 by screws 5 and positioned in opposed relationship with the recesses 3 in the magazine 2. These resilient engaging members 4 are engageable with a portion of the magazine's outer wall, preferably the aforesaid recesses 3. A magazine positioning member 1e is provided in the camera body 1. The magazine receiving chamber 6 has a magazine insertion opening formed at the rear side thereof which is remote from the body tube 1a, and the chamber 6 may be closed by a pivotable lid 7 adapted to cover the opening. The lid 7 is shown in its open position and with a portion thereof cut away. A hinge 7a pivotally supports the lid 7 with respect to the camera body 1 so that the lid may be opened to allow the magazine 2 to be inserted into the magazine receiving chamber 6 through the rear side of the camera, i.e., that side which is remote from the body tube 1a. The free end of the lid 7 provides a pawl member 7b which is engageable with a corresponding portion 1f of the camera formed at the rear side thereof. A magazine removal lever 8 is provided and has a bend $8_1$ engaged with a mating portion $2_1$ formed on at least a portion of the circumference of the magazine 2. The magazine removal lever 8 also has slots $8_2$ and $8_3$ formed therein so as to allow the lever 8 to be moved in the direction for removal of the magazine, through the cooperation with pins 12 and 13 received in these slots and fixed to the camera body. A return spring 9 extends between and is secured to the pin 13 and a projection $8_4$ on the lever 8. A plate spring 14 for resiliently pressing a side wall of the magazine 2 is attached to the camera body, preferably in such a manner that it is projectable into the magazine receiving chamber. In view of the shown construction of the aforesaid engaging members 4 for imparting a resilient pressure force to the upper surface of the magazine 2 so as to primarily prevent any positional deviation of the magazine in this direction, the plate spring 14 serves to prevent any positional deviation of the magazine in a direction substantially perpendicular to that direction. If the engaging members 4 are arranged to prevent the positional deviation of the magazine 2 in both directions, it will be apparent that the plate spring 14 may be eliminated.

Marking means 2a and 2b in the form of notches are provided in the portions of the magazine 2 for indicating the characteristic values of the film contained therein. The marking means 2a and 2b, for example, serve to transmit the information as to the film sensitivity and the information as to the film type (such as daylight type or tungsten-light type) to the camera, respectively. Film sensitivity detector pins are provided and designated by $10_1$, $10_2$, $10_3$, $10_4$ (see FIG. 2), and switch contacts $10_1'$, $10_2'$, $10_3'$, $10_4'$ are disposed in opposed relationship with the respective detector pins. A film type detector pin is provided as indicated at 11.

Figure 2:
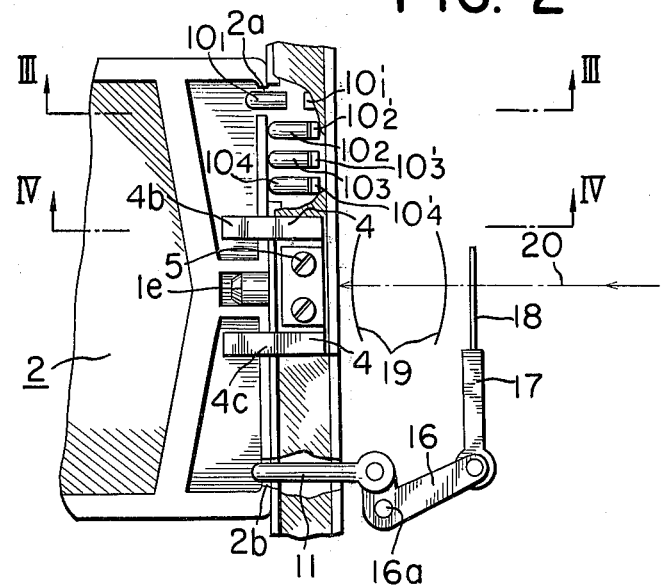
FIG. 2 is a fragmentary front view showing the essential part of the holder means of FIG. 1.

In FIG. 2, there is shown an example of the mechanism operatively associated with the pin 11 and provided in the camera body. This mechanism may be of a known type. Preferably, the detector members $10_1$-$10_4$ and 11 may be arranged to effect their detecting actions in the same direction as the direction P in which the magazine is inserted (see FIG. 4). A member 16 is operatively connected to the pin 11 at one end and pivotally movable about a shaft 16a. The other end of the member 16 is connected to a member 17 for supporting a conventional color temperature converting filter 18. A conventional optical system in the camera is only schematically shown at 19 and has an optical axis as designated by a dot-and-dash line.

FIG. 4, which is a sectional view taken along arrows IV of FIG. 2, shows an interlocking member 21 operatively associated with a film counter driving mechanism 22 of the conventional type provided in the camera body. The interlocking member 21 is normally biased for projection into the magazine receiving chamber by a spring 21a. Thus, insertion of the magazine 2 will cause the member 21 to be urged by the corresponding side wall of the magazine against the force of the spring 21a, thereby connecting a conventional film counter mechanism 23 to a film driving mechanism.

FIG. 5 diagrammatically shows an essential portion of the electrical connection of an exposure control mechanism controlled by the film sensitivity detector pins shown in FIGS. 1–4. This exposure control circuit is likewise applicable to further embodiments of the present invention to be described. The aforesaid film sensitivity detector pins $10_1$-$10_4$ and associated switch contacts $10_1'$-$10_4'$ together constitute switches S1, S2, S3 and S4, as shown in FIG. 5. Serially connected with these switches S1–S4 are correction resistors r1–r4, and these serial connections are parallel-connected to form a first branch of a Wheatstone bridge. Resistors R2, R3 and R4 are inserted in a second, a third and a fourth branch, respectively. The resistor R3 is a variable resistor provided by a photoelectric converter element. An electric source E is provided for the bridge circuit. The switches S1–S4 are shown with only the switch S1 in open position, in accordance with the positions of FIGS. 1–4.

Description will now be made of the manner in which a camera provided with a magazine holder device according to the present invention is loaded with a magazine. The lid 7 of the magazine receiving chamber 6 is first opened as shown in FIG. 1, whereafter the magazine 2 is inserted into the chamber 6 in the direction P (FIG. 4). This causes the recesses 3 in the magazine 2 to be engaged by the resilient engaging members 4, whose clamp portions 4b and 4c thus impart pressure forces in the same direction as the direction P so that the front end wall 2c of the magazine 2 is held between the clamp portions 4b, 4c and the wall 1d of the camera body 1, thus ensuring the magazine 2 to be held in a predetermined position within the magazine receiving chamber. At the same time, various mechanisms in the camera body are properly set by the camera's detector means such as detector pins $10_1$–$10_4$ and 11 in accordance with a film type representing signal, and further the interlocking member 21 is actuated to connect the film counter mechanism to its driving mechanism.

Removal of the magazine 2 from the magazine receiving chamber 6 may be accomplished by manually moving the magazine removal lever 8 in the direction of arrow against the force of the spring 9, thereby moving the magazine 2 in the same direction because the magazine 2 has its circumferential surface $2_1$ engaged with the bend $8_1$ of the lever 8.

FIG. 6 shows a modification of the magazine holder device in the camera shown in FIGS. 1–4. Unmodified parts are designated by similar characters used in FIGS. 1–4 and need not be described further.

Figure 7:
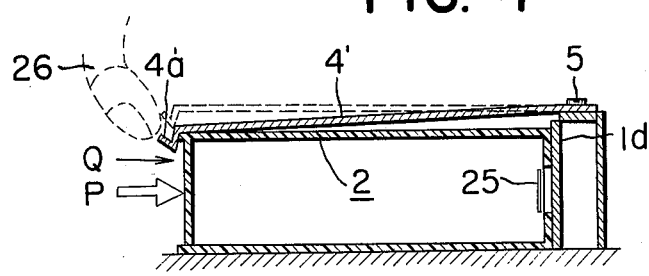
FIG. 7 is a sectional view of the FIG. 6 camera taken along arrows VII—VII of FIG. 6 and particularly showing the magazine holder means thereof.

Referring to FIGS. 6 and 7, a resilient member 4' forms a magazine holder means and has one end thereof secured to the camera body by means of screw 5. The holder member 4' has a clamp portion 4a' at the other end thereof which is engageable with at least a portion of the magazine's outer wall.

The camera body may be loaded with a magazine in the manner described hereunder. As shown in FIG. 7, the magazine 2 is moved in the direction of arrow P to cause the holder member 4' (shown by solid lines) to be resiliently displaced to a position as indicated by broken lines, thereby permitting the magazine 2 to be inserted into the magazine receiving chamber 6. When the front end of the magazine bears against the front end wall 1d of the magazine receiving chamber in the camera, the holder member 4' resiliently restores its initial position so that the clamp portion 4a' thereof imparts a resilient pressure force to the magazine 2 in the direction Q which is identical with the magazine inserting direction, thus holding the magazine 2 in a predetermined position. In accordance with the attitude of the magazine thus held, the detector means movable in the same direction as the magazine inserting direction detect the characteristic values of the film and also bring the film counter into its operative position.

Figure 8:
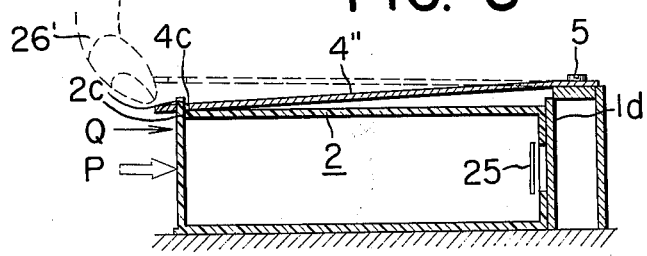
FIG. 8 is a sectional view of a modification of the magazine holder means shown in FIG. 7.

FIG. 8 shows a modified form of the holder member 4' shown in FIGS. 6 and 7. A holder member 4'' is so constructed as to fit in a projected portion 2c formed on the uppermost part of the magazine's rear wall, thereby imparting a holding pressure force in the direction Q which is identical to the magazine inserting direction P. In FIGS. 7 and 8, the magazine is simply shown for clarity with its interior omitted except a film 25 located at the apertured portion. The holder member 4' or 4'' may be raised by a finger 26 or 26' during the magazine loading.

FIG. 9 shows a further embodiment of the camera with a magazine holder means wherein a magazine 2' is adapted to be inserted laterally of the camera. Unmodified elements are designated by similar characters used in FIGS. 1–4.

As shown in FIG. 10 which is a fragmentary section of the camera shown in FIG. 9, the camera is provided with a holder member 34 having a clamp portion 34a engageable with at least a portion of the upper end face of the magazine 2' rear wall. The holder member 34 is resiliently displaceable and may be manually deflected to a phantom-line position when the magazine 2' is inserted downwardly into the camera's magazine receiving chamber in the direction P. When the magazine 2' rests on the bottom wall of the magazine receiving chamber, the holder member 34 restores its initial position and imparts a holding pressure to the magazine 2' in the direction Q identical with the magazine inserting direction P, thus holding the magazine in a predetermined position independently of the lid 27. In this case, means for detecting the film characteristic value representing markings provided at suitable locations of the magazine is movable in the same direction as the magazine inserting direction, thus effecting its detecting action. Such means is provided by a detector member 40 and a switch contact 40'. The switch 40' corresponds to the switches S1–S4 shown in FIG. 5. It will be apparent that other detector members and a connector member for connection with the film counter driving source may be provided in the same manner as described above. The lid 27 is hinged at 27a for pivotal movement and its inner side is lined with a member 28 of synthetic resin or like material which serves as a magazine keep member and also as a light-intercepting member.

It will thus be appreciated that the present invention ensures a film magazine to be held in a predetermined position within a camera's magazine receiving chamber simply by providing a camera body with a magazine holder means capable of imparting a magazine holding pressure to the magazine in a direction identical with the direction in which the magazine is inserted into the camera. Accordingly, such holder means as applied to a camera will prevent the inserted magazine from inadvertently coming off the camera body. Moreover, the holder means is very useful in that the camera's film counter mechanism can be operatively connected to the film driving mechanism in response to the proper positioning of the magazine in the magazine receiving chamber and that the film characteristic values such as sensitivity and type of the film provided on the magazine may be transmitted through the camera's detector means to the camera to enable setting of the camera's various mechanisms. Especially, the magazine holder means of the present invention applicable to cameras enables the magazine loading to be accomplished preferably upon one-touch action relative to the camera, and the holder means cooperates with manual insertion of the magazine to impart a holding pressure force to the magazine in the magazine insertion direction, thereby properly holding the magazine in a predetermined position. In addition, the film sensitivity and film type detector pins constituting the film characteristic value detector means usually provided on the camera side are located to correspond to the characteristic value representing markings provided at a portion of the magazine's outer wall, and therefore, by substantially coinciding the direction of the detection movement for such detector pins or members with the direction in which the magazine is inserted into the magazine receiving chamber, the aforesaid film characteristic values may be detected only through the insertion of the magazine into the chamber and through the holding pressure imparted from the holder means in the magazine inserting direction, but independently of the position of the lid of the camera's magazine receiving chamber. Furthermore, the member for connecting the film counter means to its driving means may be similarly actuated into operative position by the insertion of the magazine. The present invention in its preferred embodiments can achieve these special advantages.

We claim:

1. A camera system comprising:
   A. a film magazine accommodating a film therein, said magazine having two face sides and having peripheral sides substantially perpendicular to said face sides and including
      a. an opening for exposing the film provided in a first peripheral side of said magazine,
      b. first and second recesses both provided on a first face side of said magazine, located near its junction with said first peripheral side so as to leave walls respectively between said recesses and said first peripheral side and located on opposite sides of and spaced from the center of said first peripheral side,
      c. at least first and second signal applying portions symmetrically provided on said first peripheral side of said magazine, said first signal applying portion including first cut-away portion means for signaling the sensitivity of the film accommodated in said magazine, and said second signal applying portion including second cut-away portion means for signaling the type of film accommodated in said magazine, said first and second cut-away portion signaling means being respectively cut-away portions of said walls respectively between said first and second recesses and said first peripheral side, but in each case occupying only a part of said wall and leaving a substantial length thereof unaffected, and
      d. an index recess provided in said first peripheral side, constituting also a recess in said first face side and located substantially midway between said first and second recesses; and
   B. a camera including,
      a. driving means for feeding the film accommodated in said magazine,
      b. a photographic optical system for focusing light from an object to be photographed on an image forming plane,
      c. a filter selectively disposed across the optical path of said photographic optical system,
      d. a chamber for accommodating said film magazine and having an opening provided at the rear of said camera for loading or unloading said film magazine, said chamber being provided with an opening for permitting the exposure of the film on a first side of said chamber which side corresponds to said first peripheral side of said magazine,
      e. a cover for selectively covering said rear opening of said chamber for loading or unloading,
      f. an index member for positioning in place said magazine within said chamber by engaging with said index recess of said magazine, said index member projecting into said chamber of said camera,
      g. means for sensing the sensitivity of the film accommodated in said chamber, said film sensitivity sensing means being provided with a plurality of switching members for on-off control in response to the sensing of said first cut-away portion means of said magazine for signaling film sensitivity, which members are provided adjacent the location of said first signal applying portion of said magazine when in said chamber,
      h. means for sensing the type of the film accommodated in said magazine, said film type sensing means being provided with a detecting member for controlling said filter in response to the presence or absence of said second cut-away portion signaling means of said magazine,
      i. a film footage counter for indicating the consumption of the film, said counter being selectively mechanically linked with said driving means, and when linked, being placed in operating condition,
      j. means for detecting the presence or absence of said film magazine in said chamber of said camera to actuate said film footage counter, said magazine detecting means being urged into said chamber, and having a detecting member for, when detecting the presence of said magazine accommodated in said chamber, causing said counter to be mechanically linked with said driving means,
      k. a first resilient member for resiliently urging said magazine against said first side of said chamber, said first resilient member having resilient segments for engaging with said first and second recesses of said magazine over the portion of said walls unaffected respectively by said first and second signal applying portions of said magazine,
      l. a second resilient member for cooperating with said first resilient member to hold said magazine within said chamber, said second resilient member being disposed within said chamber and applying a resilient force in the direction substantially perpendicular to that of the second resilient member, and
      m. releasing means for permitting the unloading of said magazine from said chamber through said opening of said chamber provided at the rear of the camera, said releasing means having a sliding member provided with an engaging portion engageable with a portion of said magazine to permit the removal of said magazine and an operating portion for permitting movement of said engaging portion when said cover is opened;

whereby, when said magazine is accommodated within said chamber, said magazine is held in place regardless of the position of said cover, and camera setting corrections responsive to the film sensitivity and control of the filter are automatically effected.

2. A system according to claim 1, wherein said film sensitivity sensing means are provided with a group of resistors connected in series with said switching members to provide a resultant resistance for the group dependent on the conditions of said switching members, a bridge circuit including said group of resistors and a photoelectric element, and an ammeter connected to the output of the circuit.

3. A camera system comprising:
A. a film magazine accommodating a film therein including,
   a. an opening for exposing the film provided in a first peripheral side of said magazine,
   b. first and second recesses both provided on a first face side of said magazine, located near its junction with said first peripheral side so as to leave walls respectively between said recesses and said first peripheral side and located on opposite sides of and spaced from the center of said first peripheral side,
   c. at least first and second signal applying portions symmetrically provided on said first peripheral side of said magazine, said first signal applying portion including first cut-away portion means for signaling the sensitivity of the film accommodated in said magazine, and said second signal applying portion including second cut-away portion means for signaling the type of film accommodated in said magazine, said first and second cut-away portion signaling means being respectively cut-away portions of said walls respectively between said first and second recesses and said first peripheral side, but in each case occupying only a part of said wall and leaving a substantial length thereof unaffected, and
   d. an index recess provided in said first peripheral side, constituting also a recess in said first face side and located substantially midway between said first and second recesses; and
B. a camera including,
   a. driving means for feeding the film accommodated in said magazine,
   b. a photographic optical system for focusing light from an object to be photographed on an image forming plane,
   c. a filter selectively disposed across the optical path of said photographic optical system,
   d. a chamber for accommodating said film magazine and having an opening provided at the side of said camera for loading or unloading said film magazine, said chamber being provided with an opening for permitting the exposure of the film on a first side of said chamber which side corresponds to said first peripheral side of said magazine,
   e. a cover for selectively covering said opening of said chamber at the side of said camera for loading or unloading,
   f. an index member for positioning in place said magazine within said chamber by engaging with said index recess of said magazine, said index member projecting into said chamber of said camera,
   g. means for sensing the sensitivity of the film accommodated in said chamber, said film sensitivity sensing means being provided with a plurality of switching members for on-off control in response to the sensing of said first cut-away portion means of said magazine for signaling film sensitivity, which members are provided adjacent the location of said first signal applying portion of said magazine when in said chamber,
   h. means for sensing the type of film accommodated in said magazine, said film type sensing means being provided wtih a detecting member for controlling said filter in response to the presence or absence of said second cut-away portion signaling means of said magazine,
   i. a film footage counter for indicating the consumption of the film, said counter being selectively mechanically linked with said driving means, and when linked, being placed in operating condition,
   j. means for detecting the presence or absence of said film magazine in said chamber of said camera to actuate said film footage counter, said magazine detecting means being urged into said chamber, and having a detecting member for, when detecting the presence of said magazine accommodated in said chamber, causing said counter to be mechanically linked with said driving means,
   k. a first resilient member for resiliently urging said magazine against said first side of said chamber, said first resilient member having resilient segments for engaging with said first and second recesses of said magazine over the portion of said walls unaffected respectively by said first and second signal applying portions of said magazine,
   l. a second resilient member for cooperating with said first resilient member to pressure-contact said magazine with said first side of said chamber, said second resilient member being disposed within said chamber and applying a resilient force in the direction substantially the same as that of said first resilient member,
   m. releasing means for permitting the unloading of said magazine from said chamber through said opening of said chamber provided at the rear of the camera, said releasing means having a sliding member provided with an engaging portion engageable with a portion of said magazine to permit the removal of said magazine and an operating portion for permitting movement of said engaging portion when said cover is opened;
whereby, when said magazine is accommodated within said chamber, said magazine is held in place regardless of the position of said cover, and camera setting corrections responsive to the film sensitivity and control of the filter are automatically effected.

4. A camera system according to claim 3, wherein said film sensitivity sensing means is provided with a group of resistors connected in series with said switching member to provide a resultant resistance for the group dependent on the condition of said switching member, a bridge circuit including said group of resistors and a photoelectric element, and an ammeter connected to the output of the circuit.

5. A camera system comprising:
A. a film magazine accommodating a film therein including,
   a. an opening for exposing the film provided in a first peripheral side of said magazine,
   b. first and second recesses both provided on a first face side of said magazine, located near its junction with said first peripheral side so as to leave walls respectively between said recesses and said first peripheral side and located on opposite sides of and spaced from the center of said first peripheral side,
   c. said wall between said first recess and said first peripheral side of said magazine having a cutaway portion means for signaling the sensitivity of the film accommodated in said magazine provided on a signal applying portion of said magazine but in any case leaving unaffected a substantial part of said wall,
   d. an index recess provided in said first peripheral side, constituting also a recess in said first face side and located substantially midway between said first and second recesses; and
B. a camera including,
   a. driving means for feeding the film accommodated in said magazine,
   b. a photographic optical system for focusing light from an object to be photographed on an image forming plane,
   c. a filter selectively disposed across the optical path of said photographic optical system,
   d. a chamber for accommodating said film magazine and having an opening provided at the rear of said camera for loading or unloading said film magazine, said chamber being provided with an opening for permitting the exposure of the film on a first side of said chamber which side corresponds to said first peripheral side of said magazine,
   e. a cover for selectively covering said rear opening of said chamber for loading or unloading,
   f. means for sensing the sensitivity of the film accommodated in said chamber, said film sensitivity sensing means being provided with a plurality of switching members for on-off control in response to the sensing of said cut-away portion means of said magazine for signaling film sensitivity, which members are provided adjacent the location of said signal applying portion of said magazine when in said chamber,
   g. a film footage counter for indicating the consumption of the film, said counter being selectively mechanically linked with said driving means, and when linked, being placed in operating condition,
   h. means for detecting the presence or absence of said film magazine in said chamber of said camera to actuate said film footage counter, said magazine detecting means being urged into said chamber, and having a detecting member for, when detecting the presence of said magazine accommodated in said chamber, causing said counter to be mechanically linked with said driving means,
   i. a first resilient member for resiliently urging said magazine against said first side of said chamber, said first resilient member having resilient segments for engaging with said first and second recesses of said magazine engaging said first recess over said part of said wall unaffected by said cutaway portion,
   j. a second resilient member for cooperating with said first resilient member to hold said magazine within said chamber, said second resilient member being disposed within said chamber and applying a resilient force in the direction substantially perpendicular to that of the second resilient member, and
   k. releasing means for permitting the unloading of said magazine from said chamber through said opening of said chamber provided at the rear of the camera, said releasing means having a sliding member provided with an engaging portion engageable with a portion of said magazine to permit the removal of said magazine and an operating portion for permitting movement of said engaging portion when said cover is opened;
whereby, when said magazine is accommodated within said chamber, said magazine is held in place regardless of the position of said cover, and camera setting correction responsive to the film sensitivity is automatically effected.

6. A camera system according to claim 5, wherein said film sensitivity sensing means is provided with a group of resistors respectively connected in series with said switching members to provide a resultant resistance for the group which depends on the conditions of said switching members, a bridge circuit including said group of resistors and a photoelectric element, and an ammeter connected to the output of the circuit.

7. A camera system comprising:
A. a film magazine accommodating a film therein including,
   a. an opening for exposing the film provided in a first peripheral side of said magazine,
   b. first and second recesses both provided on a first face side of said magazine, located near its junction with said first peripheral side so as to leave walls respectively between said recesses and said first peripheral side and located on opposite sides of and spaced from the center of said first peripheral side,
   c. a signal applying portion provided on said first peripheral side of said magazine and including at least one linear cut-away portion of said wall between said first recess and said first peripheral side, the length of said linear cut-away portion being representative of the sensitivity of the film accommodated in said magazine but in all cases being substantially shorter than the entire length of said wall so as to leave a substantial part of said wall unaffected by said signal applying portion; and
B. a camera including,
   a. driving means for feeding the film accommodated in said magazine,
   b. a photographic optical system for focussing light from an object to be photographed on an image forming plane,
   c. a chamber for accommodating said film magazine and having an opening provided at the rear of said camera for loading or unloading said film magazine, said chamber being provided with an opening for permitting the exposure of the film on a first side of said chamber which side corresponds to said first peripheral side of said magazine, d. a cover for selectively covering said rear opening of said chamber for loading or unloading, e. means for sensing the sensitivity of the film accommodated in said chamber, said film sensitivity sensing means being provided with a plurality of switching members which are disposed parallel with and correspondingly to said linear cutaway portion of length representative of film sensitivity, said switching members partly projecting into said chamber, f. a resilient member for urging said magazine against said first peripheral side of said chamber, said resilient member having resilient segments for engaging with said first and second recesses of said magazine, passing over said unaffected portion of said wall to engage said first recess, and holding said magazine in place, when disposed at such a position that said film sensitivity sensing means is actuated, regardless of the position of said cover, g. releasing means for permitting the unloading of said magazine from said chamber through said opening of said chamber provided at the rear of the camera, said releasing means having a sliding member provided with an engaging portion engageable with a portion of said magazine to permit the removal of said magazine and an operating portion for permitting movement of said engaging portion when said cover is opened;

whereby, when said magazine is accommodated within said chamber, said magazine is held in place regardless of the position of said cover, and camera setting correction responsive to the film sensitivity is automatically effected.

* * * * *

UNITED STATES PATENT OFFICE
CERTIFICATE OF CORRECTION

Patent No. 3,896,465      Dated July 22, 1975

Inventor(s) Tomoshi TAKIGAWA et al.

It is certified that error appears in the above-identified patent and that said Letters Patent are hereby corrected as shown below:

On the cover page, first column, following item [63] entitled "Related U.S. Application Data", insert

[30]      Foreign Application Priority Data

May 13, 1971     Japan .................. 38294/1971

Signed and Sealed this twenty-seventh Day of April 1976

[SEAL]

Attest:

RUTH C. MASON
*Attesting Officer*

C. MARSHALL DANN
*Commissioner of Patents and Trademarks*